United States Patent [19]

Caswell

[11] 4,088,284
[45] May 9, 1978

[54] PHASING CONTROL FOR CONVERTIPLANE

[75] Inventor: Berwyn B. Caswell, Smithville, Tex.

[73] Assignee: Textron, Inc., Providence, R.I.

[21] Appl. No.: 651,173

[22] Filed: Jan. 21, 1976

[51] Int. Cl.² .............................................. B64C 27/28
[52] U.S. Cl. .................................. 244/7 R; 244/12.4; 416/36
[58] Field of Search .................. 244/7 R, 7 C, 12 A, 244/56, 83 G, 83 J, 12.4; 416/36; 74/469

[56] References Cited

U.S. PATENT DOCUMENTS

| 2,702,168 | 2/1955 | Platt | 244/7 R |
| 3,112,901 | 12/1963 | Kohman | 244/7 R |
| 3,117,745 | 1/1964 | Ellis et al. | 244/7 C |
| 3,514,052 | 5/1970 | McKeown | 244/7 R |

*Primary Examiner*—Barry L. Kelmachter

*Attorney, Agent, or Firm*—Richards, Harris & Medlock

[57] ABSTRACT

A convertiplane having control apparatus for modification of the control signals during the course of transition in either direction between a helicopter mode and the aircraft mode. The convertiplane has at least one pylon rotatable about a lateral axis, positioned parallel to the longitudinal axis of the convertiplane to a position normal to the axis for selective operation in the airplane mode and in the helicopter mode, respectively. Rotor blades are provided on each pylon with a control linkage responsive to pilot input in the helicopter mode to vary the collective and cyclic pitch of the rotor blades. Drive linkages are provided to change the pylons from one mode position to the other mode position. Control linkages are operatively associated in synchronism with the drive linkages to alter the authority of the pilot control to change the pitch of the blade during transition.

8 Claims, 8 Drawing Figures

PHASING CONTROL FOR CONVERTIPLANE

This invention relates to convertiplanes, and more particularly to modification of control signals in the course of transition in either direction between a helicopter configuration and an airplane configuration. In a more specific aspect, a conversion input signal is produced with magnitude thereof proportional to movement of a pylon about a transverse axis between helicopter and airplane configurations for establishing a reduced authority in power lever input in the airplane configuration as compared with the helicopter configuration and for reducing the authority of cyclic control input as a function of forward airspeed.

Attempts have been made to combine the desirable operating characteristics of aircraft of airplane configuration and aircraft of helicopter configuration. Several convertiplanes heretofore have been constructed and flown. None, however, have embodied all attributes necessary to make production thereof feasible.

One problem involved is the modification of the control signals for the aircraft during conversion from one configuration to another such that the same input mechanisms actuated by a pilot can be used in both configurations where they function in a manner substantially normal to the functions performed in the airplane configuration and in the helicopter configuration.

Aircraft in the airplane configuration are maneuvered by control of three sets of control surfaces, i.e., ailerons, elevators and rudder. Maneuvers are executed generally by simultaneous deflection of more than one of the control surfaces.

In helicopters, maneuvers are executed by control of the rotor blade pitch both in the fore/aft and lateral sense, modification of collective pitch of the rotor blade and the control of the tail of the aircraft through the tail rotor. Helicopters generally operate with the rotors automatically controlled for constant RPM. The thrust or load is varied by varying the pitch on the rotor blades. Thus, the pilot actuates a control stick which introduces roll and pitch commands. He operates control pedals to introduce yaw commands. A power lever is provided to control collective pitch. Roll and pitch commands have the effect of modifying cyclic pitch of the rotor blades. Yaw commands modify the collective pitch of the tail rotor unless multiple main rotors are involved, as in this aircraft. Ailerons, elevators and rudders are not involved.

The present invention is directed to a twin rotor convertiplane in which counter rotating rotors are mounted on pylons at the ends of wing structures with controls being provided for executing all necessary commands through the same control instrumentalities in the airplane and helicopter configurations with the predetermined and desired transition in authority of the various controls during transition from one configuration to the other.

More particularly, in accordance with the present invention, a convertiplane is provided having at least one pylon rotatable about a lateral axis from a position parallel to longitudinal axis of the convertiplane to a position normal to the axis for selective operation in the airplane mode and helicopter mode, respectively. Rotor blades are provided on each pylon with a control linkage responsive to pilot input in the helicopter mode to vary the collective and cyclic pitch of the rotor blades. Drive means are provided to change the pylons from one mode position to the other mode position. Means are operable in synchronism with the drive means to alter the authority of the pilot control to change pitch of the blade.

The novel features believed characteristic of the invention are set forth in the appended claims. The invention itself, however, as well as further objects and advantages thereof, will best be understood by reference to the following detailed description of an illustrative embodiment taken in conjunction with the accompanying Drawings, in which:

Figure 1:
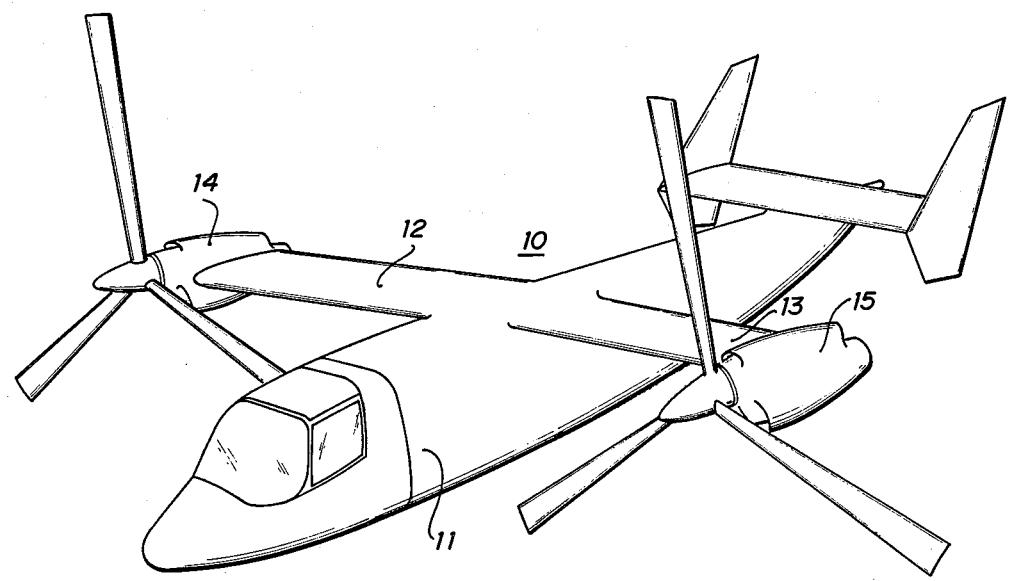
FIG. 1 illustrates a convertiplane in the airplane configuration.

FIG. 1 illustrates a convertiplane 10 having a fuselage 11 with wings 12 and 13. Pylons 14 and 15 are mounted on the ends of wings 12 and 13, respectively, and are adapted to be positioned in the airplane configuration shown in FIG. 1 or to be rotated about a transverse axis 15a to the configuration shown in FIG. 2. More particularly, the conversion axis 15a for pylon 15 is characterized by a large pivot spindle which is anchored in the end of wing 13 and provides a rotatable support for the pylon 15.

Figure 3:
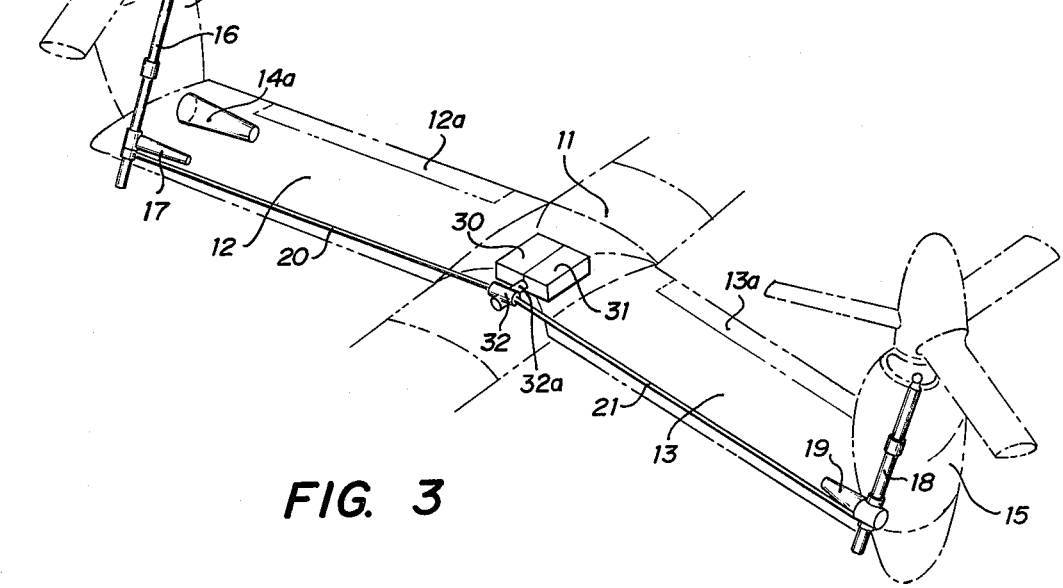
FIG. 3 illustrates a conversion drive mechanism.

As shown in the enlarged view of FIG. 3, the pylon 14 is rotatably mounted on a spindle 14a. Pylon 14 is positioned either in the airplane configuration or the helicopter configuration by a motor driven double acting screw 16. Screw 16 is also anchored in wing 12 on a spindle 17. In a similar manner, a screw 18 controls a pylon 15 with a pivotal anchor in the spindle 19. The positions of the pylons 14 and 15 are changed through a power drive applied through shafts 20 and 21 which extend outward from fuselage 11 adjacent to the leading edge of wings 12 and 13, respectively.

In the airplane configuration of FIG. 1, the pitch of the rotor blades is changed to alter the thrust and thereby vary the aircraft speed. As is conventional in the operation of helicopters, the rotors are operated at a constant RPM but the pitch is changed to change load thereon. Further, in the airplane configuration, it is desirable to change blade pitch differentially in effecting change in direction.

Figure 2:
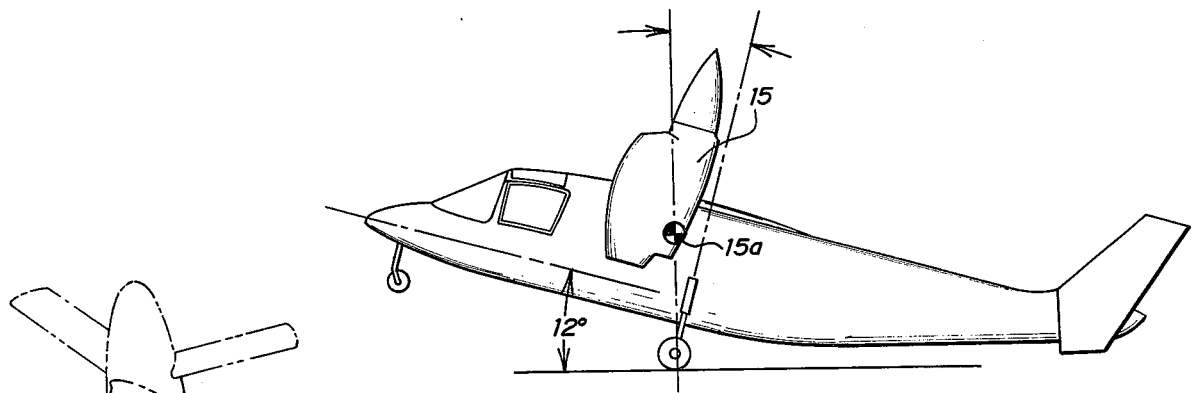
FIG. 2 illustrates the aircraft of FIG. 1, but in helicopter configuration.

In contrast, in the helicopter configuration of FIG. 2, provision must be made for altering the pitch of the rotor blades cyclically as well as collective pitch.

Further, as conversion is made from the helicopter configuration of FIG. 2, as would be typical at takeoff, to the airplane configuration shown in FIG. 1, typical of the flight attitude after takeoff, there must be a controlled conversion. That is, there must be a controlled change of authority on the various aircraft attitude determining mechanisms so that the transition can be made properly from vertical flight in which the rotors supply the lifting forces to horizontal flight in which the wing dynamics supply the lifting forces and in which the rotors supply only thrust and not lift.

In order to make this conversion in accordance with the present invention, a pair of mixing boxes 30 and 31 are mounted centrally in the fuselage 11 and the region of the root of wings 12 and 13.

The mixing boxes will hereinafter be referred to as the cyclic mixing box 30 and the collective mixing box 31. The mixing boxes are provided with a phasing control signal from a phasing gearbox 32 which operates in synchronization with the conversion drive provided on shafts 20 and 21. More particularly, when the motor driven double acting screws 16 and 18 are in operation, they extend or retract in length as well as impart a rotational motion to shafts 20 and 21. In response thereto, the phasing gear box 32 supplies a phasing control signal to the mixing box 31. The gear box 32 may be of any suitable type which is controllable in accordance with the power drive applied by way of shafts 20 and 21. By way of example, the gear box may be a double acting screw such as screws 16 and 18 which imparts a translatory motion to shaft 32a of FIG. 3.

Figure 4:
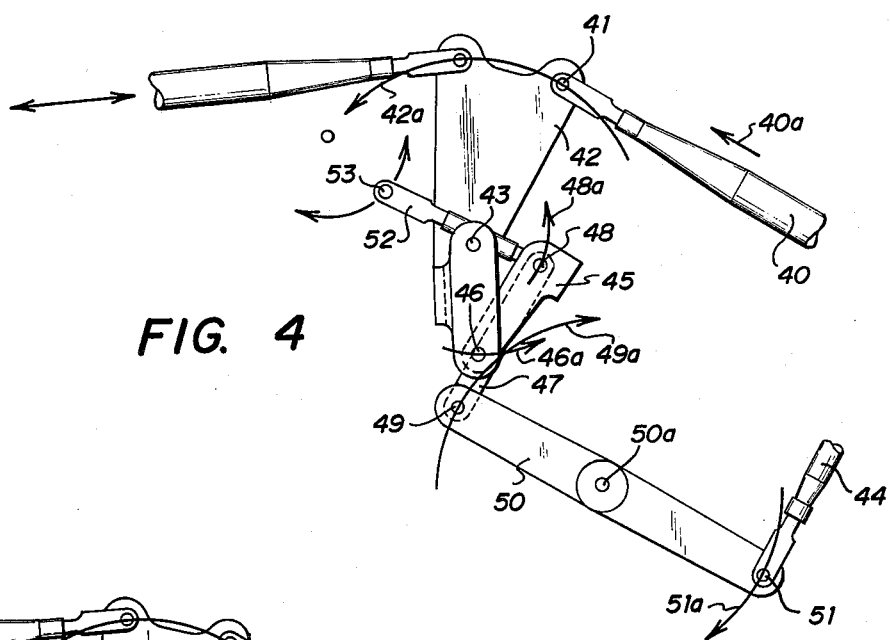
FIG. 4 illustrates a conversion washout mechanism embodied in the present invention.

While there are several functions that must be subject to phasing in and out as a part of conversion from helicopter to aircraft configuration, it will be helpful at this point before considering further details of the mixing boxes 30 and 31 to consider the action involved in phasing out a control function during conversion. For such purpose, refer to FIGS. 4 and 5. In FIG. 4, a control tube assembly 40 leads to a pivot point 41 on a bell crank 42 which is mounted on pivot 43. The tube assembly 40 for purposes of the present description will be considered to be a pilot input to command roll of helicopter. For this purpose, an output tube assembly 44 will be considered leading to a swashplate to introduce cyclic pitch as is necessary for executing the roll command. The linkage between bell crank 42 and tube 44 includes a phasing link 45 pivoted at the lower end of bell crank 42 at the pivot point 46. A link 47 is then pivotally connected in the upper end of the phasing link 45 at pivot 48. Link 47 is coupled at its lower end at pivot 49 to a crank arm 50 supported on shaft 50a and connected at its right end at pivot 51 to the output tube assembly 44. A phasing or conversion control link 52 is connected to the pivot 48 to control the position of the phasing link 45 relative to bell crank 42.

In the position shown in FIG. 4, motion of the tube assembly 40 in the direction of arrow 40a causes rotation of bell crank 42 in the direction of arrow 42a. This causes the pivot 46 to move in the direction of arrow 46a. Such movement causes pivot 48 to move in the direction of arrow 48a. Since pivot 48a is secured by conversion link 52, the pivot 48a moves along a path having a center at the pivot 53 of the conversion link 52. Thus, pivot 49 moves in the direction of arrow 49a. This causes pivot 51 and thus the lower end of the tube assembly 44 to move in the direction of arrow 51a.

Figure 5:
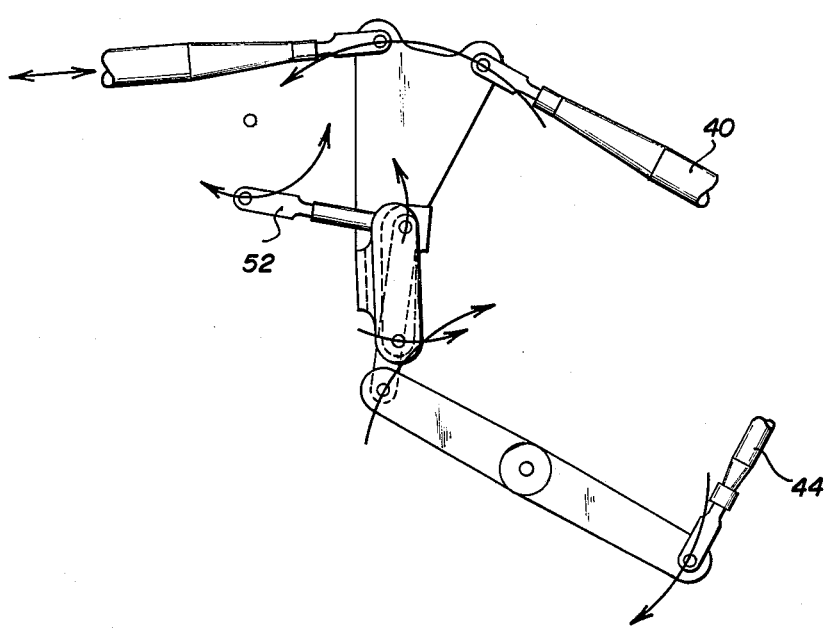
FIG. 5 illustrates the mechanism of FIG. 4 in washout position.

In contrast, as shown in FIG. 5, if during conversion the pivot 48 is moved by the conversion link 52 so that the axis of pivot 48 coincides with the axis of the pivot 43, then any motion of the tube assembly 40 will not produce any motion of the output tube assembly 44.

In mixing boxes 30 and 31 of FIG. 3, there are three such phasing linkages employed.

Figure 6:
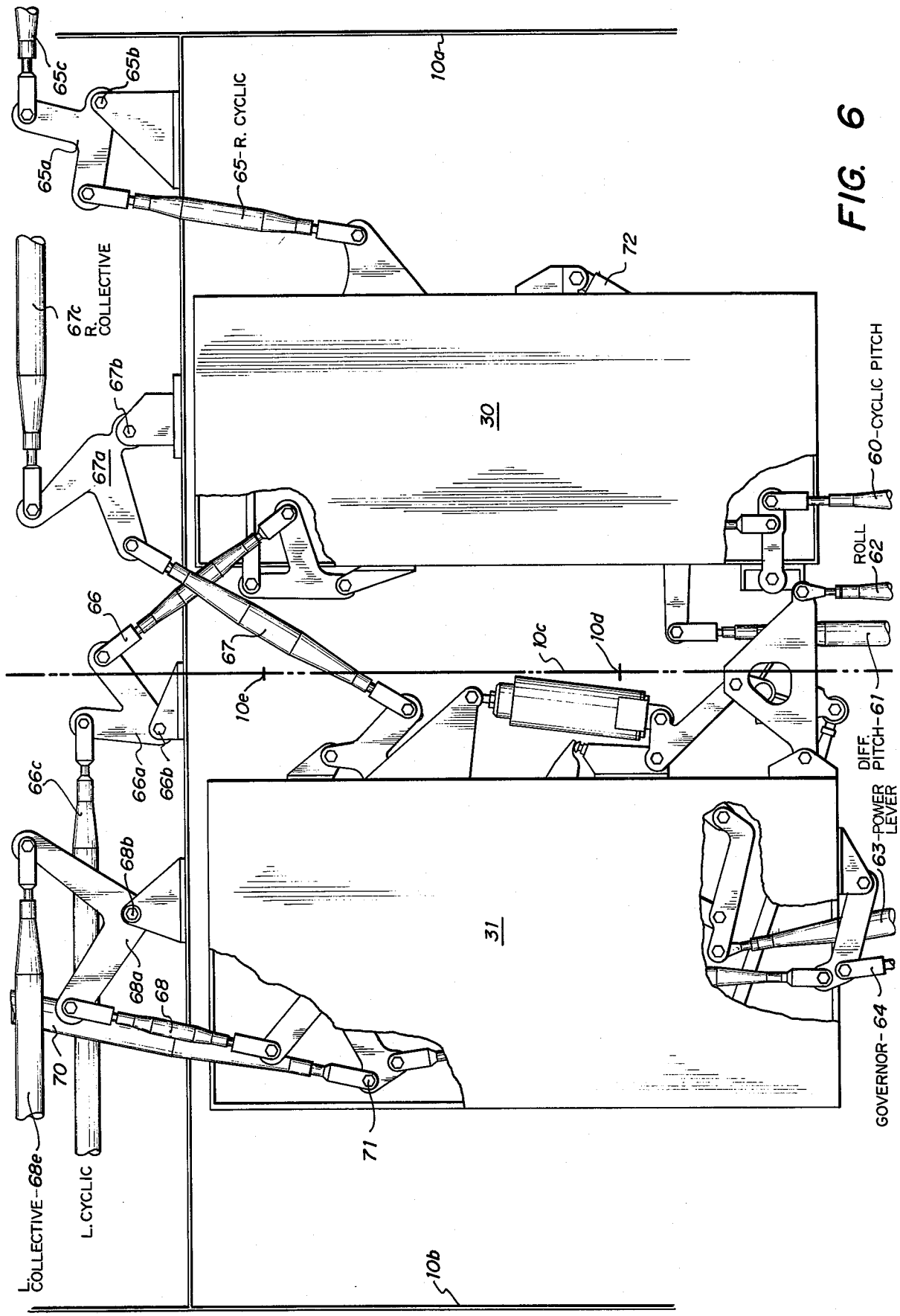
FIG. 6 is a plan view of controls leading to and from a cyclic mixing box and a collective mixing box used for conversion between the configurations of FIG. 1 and FIG. 2.

Referring now to FIG. 6, cyclic mixing box 30 and collective mixing box 31 are shown as viewed from above and looking forward in aircraft 10. Mixing boxes 30 and 31 are mounted in the fuselage 11 generally in alignment with the wings with the right side wall of the fuselage and the left side wall being located approximately at the points indicated by the dotted lines 10a and 10b, respectively. As is illustrated in FIG. 3, wings 12 and 13, extending from body 10, have ailerons or flaps 12a and 13a. Because of dual functions performed in the airplane and helicopter mode, flaps 12a and 13a are termed flaperons. They were located in one embodiment of the invention such that a line extending through the body from the trailing edge of the flaperons intersected the center line 10c at about point 10d with the flaperon hinge lines intersecting the center line 10c at about point 10e. The foregoing provides an indication of the location of the mixing boxes 30 and 31 relative to the aircraft structure.

Cyclic mixing box 30 has two inputs thereto in the form of mechanical displacements of control tubes 60 and 61. Control tube 60 serves to introduce into box 30 control displacement for cyclic pitch changes as a pitch command. Tube 61 serves for the introduction of control displacement for differential cyclic pitch changes. Differential means that the cyclic pitch on the blades of pylon 14 are different from those introduced into the blades of pylon 15 whereas the cyclic commands introduced by tube 60 cause the same effect in the blades of both rotors.

Mixing box 31 has three inputs which are supplied by way of tubes 62, 63 and 64. Tube 62 introduces commands for lateral or roll control. Tube 63 introduces commands for changing the power level of the engines in pylons 14 and 15. Tube 64 serves to introduce the governor control so that the rotors operate at a constant speed.

Mixing box 30 has two output linkages, namely the tubes 65 and 66. Tube 65 leads to a crank arm 65a which is pivoted at point 65b to provide an output control tube 65c which leads to a cyclic input linkage of the right hand pylon 14. Tube 66 is connected to a bell crank 66a which is pivoted at point 66b to provide an output by way of linkage 66c. Linkage 66c leads to the cyclic input mechanism on the left hand pylon 15.

Mixing box 31 has two output tubes 67 and 68. Tube 67 leads to a crank arm 67a which is pivoted at point 67b to provide control motion on a linkage 67c leading to the collective input in the right hand pylon 14. Tube 68 is connected to a bell crank 68a pivoted at point 68b to provide control motion in linkage 68e leading to the collective input mechanism of the left hand pylon 15.

A conversion control input signal is supplied to the collective mixing box 31 from the unit 32 of FIG. 3. More particularly, shaft 32a of the gear box 32 is extended or retracted when shafts 20 and 21 rotate. This develops a motion transmitted by way of tube 70 which is coupled to the shaft 32a by any suitable conventional means such as a bolted joint, and to the mechanism in mixing box 31 at the pivot point 71. Thus, as the aircraft is converted from the helicopter configuration of FIG. 2 to the airplane configuration of FIG. 1, a motion in tube 70 alters the authority of input tubes 62 and 63 over the magnitude of the outputs on output tubes 67 and 68. Cyclic mixing box 30 operates independently of the conversion signal on tube 70. Rather, the authority of the input tube 61 over the output motions of linkages 65 and 66 is changed as a function of airspeed. An airspeed sensor is utilized to control a differential cyclic washout actuator 72.

Figure 7:
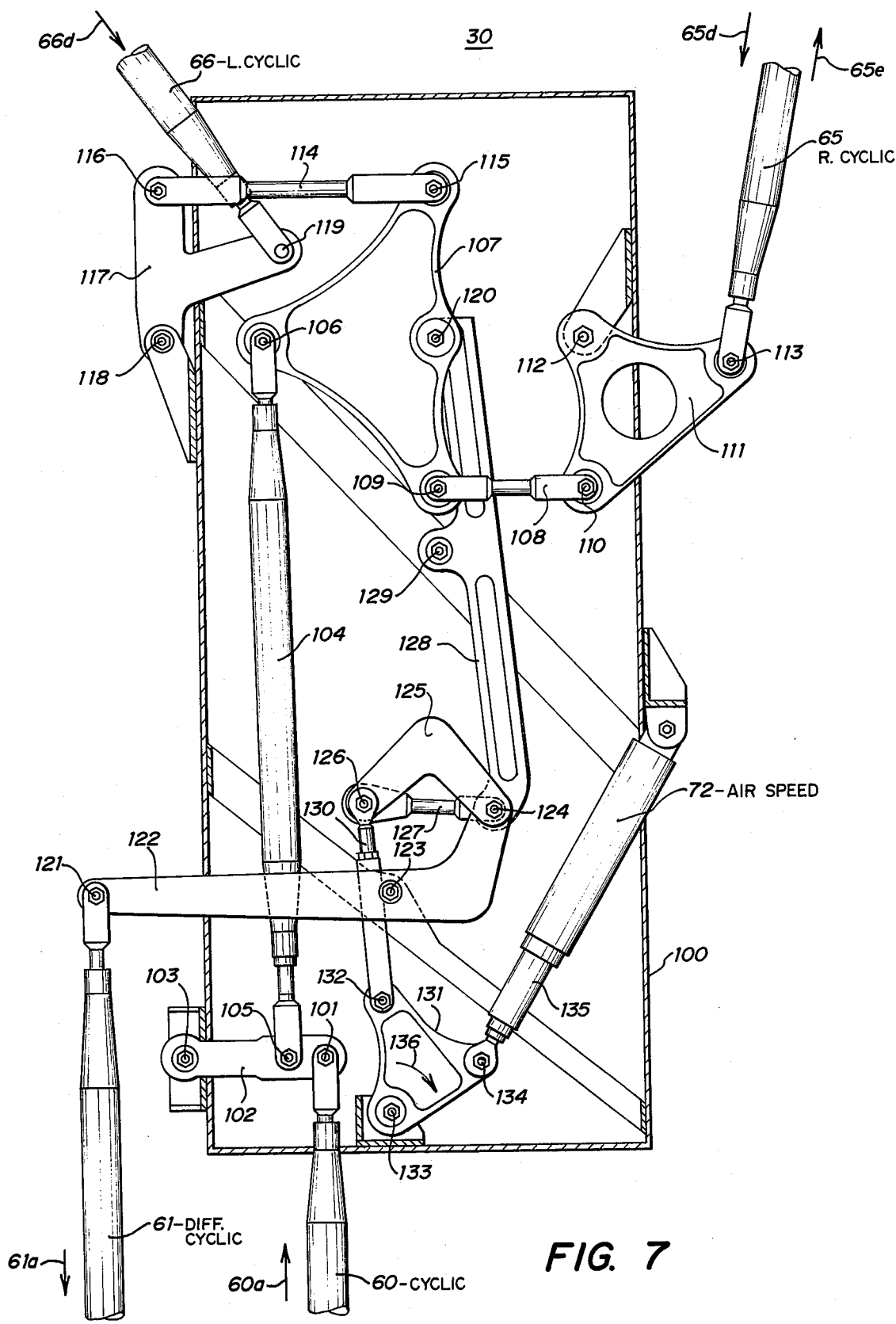
FIG. 7 is an enlarged, more detailed view of the cyclic mixing box of FIG. 6.

Now that the mixing boxes 30 and 31 have been oriented with respect to the aircraft and the inputs and outputs thereof have been defined, reference may now be had to FIG. 7 which provides a more detailed showing of cyclic mixing box 30.

Mixing box 30 comprises a rectangular polyhedron framework 100 within which the cyclic signals on tubes 60 and the differential cyclic inputs on tube 61 are mixed to provide the desired outputs on the output tubes 65 and 66.

Cyclic input tube 60 is connected at a pivot 101 to the outer end of an arm 102 which is linked to the frame 100 at pivot 103. A tube 104 is connected to an intermediate pivot 105 on arm 102 and extends to a pivot 106 on a bell crank 107. Bell crank 107 is a mixing bell crank. Bell crank 107 has two output linkages. The first output linkage comprises a link 108 connected to the bell crank 107 at pivot 109 and in turn is connected at pivot 110 to a bell crank 111 which is connected to frame 100 at pivot 112. Tube 65 is connected to bell crank 111 at pivot 113. The second output linkage comprises the tube 114 connected to the upper pivot 115 on bell crank 107. Tube 114 is connected at pivot 116 to a bell crank 117 which is connected at pivot 118 to frame 100. Bell crank 117 is connected at pivot 119 to output tube 66. Thus, with the pivot point 120 on bell crank 107 in fixed position, the input motion in the direction of arrow 60a introduced by way of tube 60 causes output tubes 65 and 66 to move in the same direction, i.e., in the direction indicated by arrows 65d and 66d.

A differential cyclic input command is introduced by way of tube 61. Tube 61 is connected at pivot 121 to the outer end of an arm 122 which is coupled to the frame 100 at a pivot 123 midway along the length thereof. The other end of the arm 122 is connected at pivot 124 to an L-shaped arm 125. Arm 125 is connected at pivot 126 to two tubes. The first tube 127 is connected at a pivot coincident with pivot 124 to the lower end of arm 128. Arm 128 is connected at its upper end to bell crank 107 at pivot 120 and is connected to frame 100 at pivot 129.

Thus, when a differential cyclic input command is given by movement of tube 61 in the direction of arrow 61a with the pivot 106 supported to rotate about pivot 105. The output tube 65 moves in the direction of arrow 65e and output tube 66 moves in the direction of arrow 66d. That is, in this case, tubes 65 and 66 move in opposite directions.

Pivot 126 is connected by way of the second tube 130 to a bell crank 131 at pivot 132. Bell crank 131 is connected to frame 100 at pivot 133 and at pivot 134 to the actuating arm 135 of the airspeed controlled actuator 72. As airspeed increases during conversion from helicopter to airplane configuration, the authority of the differential cyclic command is substantially decreased by operation of the actuator 72. More particularly, as airspeed increases, the actuating rod 135 is extended farther from actuator 72 causing bell crank 131 to rotate in the direction of arrow 136. This causes the pivot point 126 to be pulled down towards the pivot point 123. If it is pulled down to the point that points 123 and 126 coincide or are in alignment with one another, then the differential cyclic input signals on tube 61 will have no effect on the output tubes 65 and 66 because of the action above described in connection with FIGS. 4 and 5.

Figure 8:
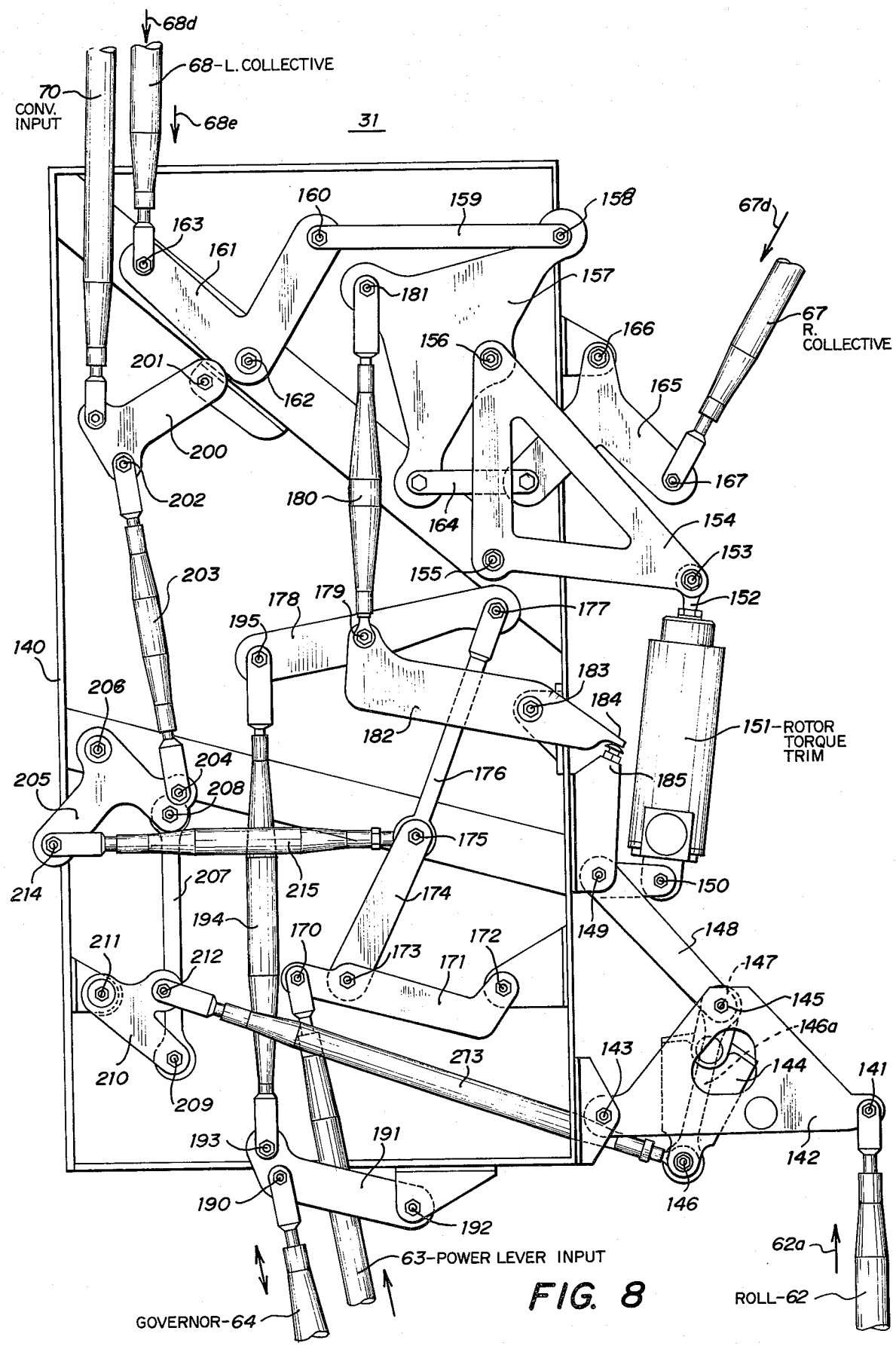
FIG. 8 is an enlarged, more detailed view of the collective mixing box of FIG. 6.

Referring now to FIG. 8, collective mixing box 31 has been illustrated in further detail to show the linkages between the roll command input tube 62, the power lever input tube 63, the governor control tube 64 and the right output tube 67 and the left output tube 68. Mixing box 31 has two washout linkages of the type generically represented by FIGS. 4 and 5. One washout linkage serves to decrease the control on the outputs of input commands applied via tube 62. The other serves to washout power lever input signals on input tube 63 in response to input conversion commands introduced by way of the phasing actuator tube 70.

Collective mixing box 31 comprises a rectangular polyhedron open framework 140 which is to be secured to the airframe immediately to the left side of the cyclic mixing box 30.

Input tube 62 is connected to an input pivot 141 on a bell crank 142 which in turn is connected to frame 140 at pivot 143. A winged link 144 pivotally connected to bell crank 142 at pivot 145 is connected at its lower end to two links. The first link 146a is connected at the bottom pivot 146 and extends upward to a pivot 147, which is coincident with pivot 145 in the illustrated position. Pivot 147 is connected to a bell crank 148 which is pivoted to frame 140 at point 149 and connected at its end by way of a pivot 150 to an actuator 151. By this means, motion of bell crank 142 on pivot 143 transfers the motion of the same sense to bell crank 148.

A piston 152 of actuator 151 is connected at pivot 153 to a bell crank 154 which is connected to the frame 140 at pivot 155. The upper end of bell crank 155 is connected at pivot 156 to an intermediate point on a bell crank 157. The upper end of bell crank 157 is connected at pivot 158 to a link 159 which in turn is connected at pivot 160 to a bell crank 161. Crank 161 is connected to frame 140 at pivot 162. The output end of bell crank 161 is connected at pivot 163 to the left collective output tube 68.

The lower end of the bell crank 157 is connected by way of a link 164 to a bell crank 165 which is pivoted from frame 140 at pivot 166. The output end of bell crank 165 is connected at pivot 167 to the left collective output tube 67.

By the foregoing linkages, input motion in the direction of arrow 62a causes motion of output tubes 67 and 68 in the direction of arrows 67d and 68d.

The power lever input tube 63 is connected at pivot 170 to the outer end of a crank arm 171 which is connected at pivot 172 to frame 140. An intermediate pivot 173 on arm 171 is connected by arm 174 to a movable pivot 175 and thence by way of a link 176 to a pivot 177 on a crank arm 178. Crank arm 178 is connected at a central pivot 179 through a rod 180 to a fourth pivot 181 on the bell crank 157. Pivot 179 on arm 178 is also connected by way of an arm 182 to a pivot 183 on frame 140. The outer end 184 of the arm 182 cooperates with an adjustable stop 185.

Governor tube 64 is connected at a pivot 190 to a crank arm 191 which in turn is connected at pivot 192 to frame 140. An end pivot 193 is connected by way of rod 194 to a pivot 195 on the end of arm 178 opposite pivot 177. By this means the power lever input signals and the governor input signals are mixed in lever arm 178, the output of which is mixed in the bell crank 157 with the signals from the lateral roll tube 62. The actuator 151 is a rotor torque trim actuator operated under the control of the pilot.

As earlier indicated, there are two washout linkages in mixing box 31 which are responsive to the conversion signal on tube 70. More particularly, tube 70 is connected to a toggle 200 which is connected to the frame 140 at pivot 201. The toggle 200 is connected at pivot 202 to a tube 203 which in turn is connected at pivot 204 to a bell crank 205. Bell crank 205 is connected to frame 140 at pivot 206. Bell crank 205 has two outputs. The first output comprises a tube 207 connected at pivot 208 and extending to a pivot 209 on a bell crank 210. Bell crank 210 is connected to frame 140 at pivot 211. A tube 213 is connected at one end to bell crank 210 at pivot 212. The opposite end of the tube 213 is connected to a pivot point 146 on the winged link 144. The tube 213 serves to change the distance between pivot points 143 and 146 thereby changing the authority of the inputs on tube 62 in forcing movement of the actuator 151. Should the pivot point 146 be drawn up to coincide with pivot 143, then the motion of the input tube 62 would have no effect on the output tubes 67 and 68.

The second output of the bell crank 205 extends from pivot 214 by way of link or tube 215 to pivot 175. Link 215 serves the function of moving the pivot point 175 toward pivot 172 thereby changing the authority that the power lever input tube 63 has on motion of the pivot 177. If pivot 175 is moved into alignment with pivot 172, then the power lever input is completely washed out and totally ineffective. In the helicopter configuration, the distance between pivots 143 and 146 and the distance between pivots 175 and 172 are maximized. In the airplane configuration, the distances are minimized. Thus, during conversion from helicopter to airplane configuration, the motion of tube 68 is in the direction of the arrow 68e.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a convertiplane having a pylon rotatable about a lateral axis from a position parallel along a longitudinal axis to a position normal to said longitudinal axis for selective operation in an airplane mode and a helicopter mode, respectively, the combination comprising:
    (a) rotor blades on said pylon and a control linkage responsive to pilot input in said helicopter mode to vary collective and cyclic pitch of said rotor blades;
    (b) drive linkage means for rotating said pylon about said lateral axis; and
    (c) input means connected to said drive linkage means and operable by said drive linkage means for reducing the authority of the pilot input on collective pitch as said pylon is rotated toward said position parallel to said longitudinal axis.

2. The combination set forth in claim 1 including means operable in association with said control linkage for altering the authority of differential cyclic input signals in response to variations in forward airspeed of said convertiplane.

3. In a convertiplane, control box means having:
    (a) a cyclic command input lever and a differential cyclic command input lever;
    (b) right hand and left hand cyclic output levers;
    (c) a first linkage means interconnecting said cyclic input lever and said output levers for like movements thereof upon a given movement of said cyclic input lever;
    (d) a second linkage means interconnecting said differential input lever and said output levers for producing movement in opposite senses of said output levers for a given input on said differential input lever; and
    (e) control means for selectively altering the magnitude of response of said output levers with respect to movement of said differential input lever in dependence upon the forward airspeed of said convertiplane wherein said control means includes third linkage means actuated in response to a forward airspeed sensor.

4. The combination set forth in claim 3, in which said input levers are independently connected to a mixing lever and wherein one of said connections includes a transfer lever having a pivot and the output of which is connected to said mixing lever through a bell crank one pivot point of which may be moved toward and away from said pivot of said transfer lever in proportion to variations in the forward airspeed of said convertiplane.

5. The combination set forth in claim 3, in which said second linkage means extending between said differential input lever and said output levers include an air speed control washout linkage.

6. The combination set forth in claim 5, in which the third linkage means are provided to render said movements of said differential input lever less effective as said forward airspeed increases.

7. In a convertiplane having a mechanism for varying the attitude of a rotor axis between a forward thrust position and a vertical lift position and for producing a conversion command displacement proportional to the attitude of said axis relative to said two positions the combination which comprises:
    (a) a collective transfer mechanism having a roll command displacement input, a power command displacement input, a governor displacement input and said conversion command displacement input;
    (b) collective output lever means leading from said mechanism;
    (c) a first washout linkage between said roll input and said output lever means;
    (d) a second washout linkage between said power input and said output lever means; and
    (e) means responsive to said conversion input to maximize through said washout linkages the authority of said roll command input and said power input when said axis is in said lift position.

8. In a convertiplane having rotor pylons having control means for varying cyclic and collective pitch and mounted on wings extending from a fuselage with a power driven mechanism extending between said pylons to vary the orientation of the axes thereof from a forward thrust position to a vertical lift position, the combination which comprises:
    (a) a pair of command transfer linkages including:
        (i) a collective pitch command transfer linkage having a conversion input connected to said mechanism, a power lever input and a roll command input, and
        (ii) a cyclic command transfer linkage having a cyclic input and a differential cyclic input;
    (b) a pair of washout structures in said collective transfer linkage responsive to said mechanism to maximize the output response to said power lever input and to said roll input when in the helicopter configuration, and means in said cyclic transfer linkage to minimize the output response to said differential cyclic input as forward airspeed of said convertiplane increases.

* * * * *